March 1, 1932.   M. W. McLAREN   1,847,844
LEVEL INDICATOR
Filed March 7, 1929   2 Sheets-Sheet 1
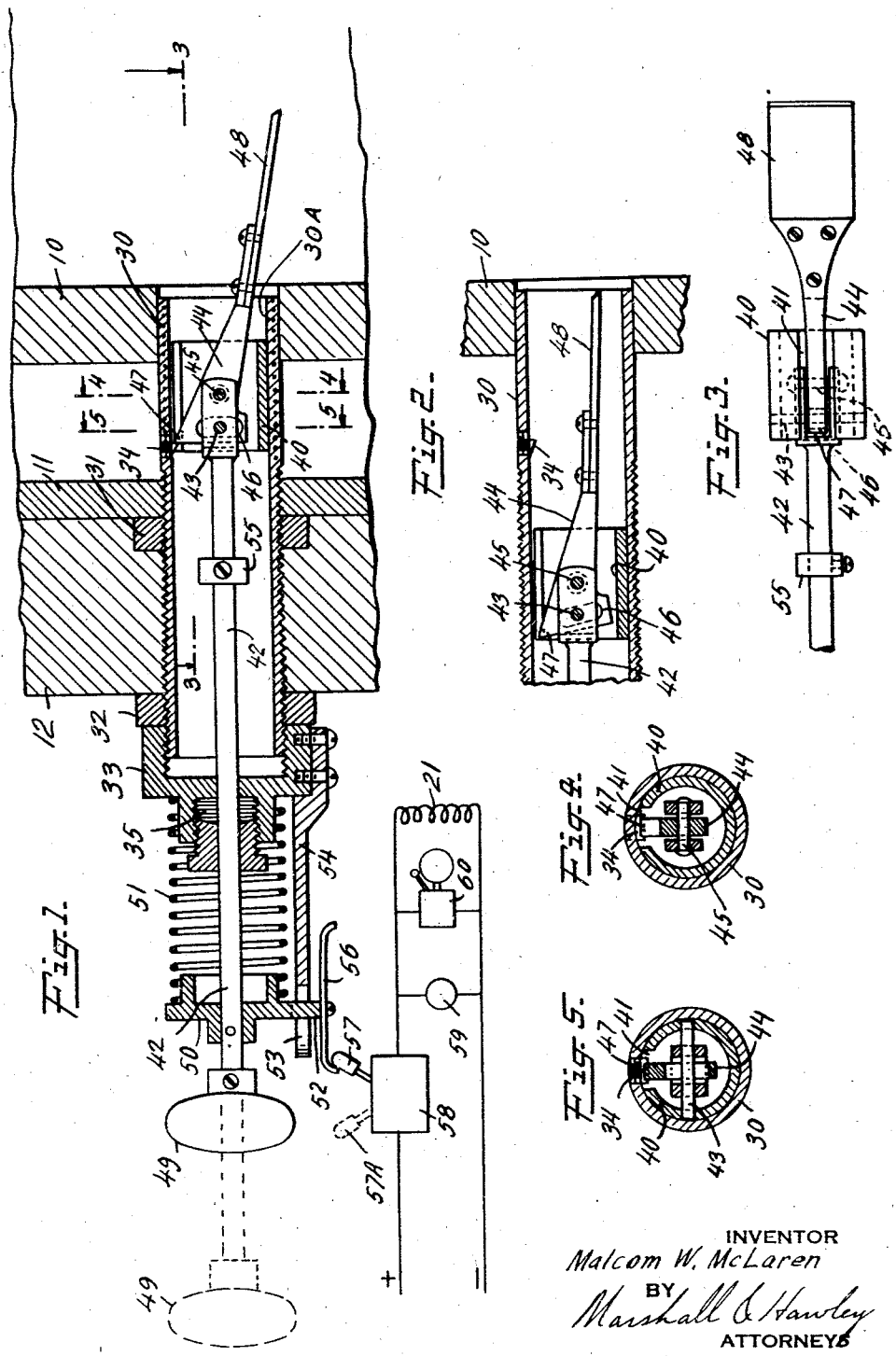
INVENTOR
Malcom W. McLaren
BY
Marshall & Hawley
ATTORNEYS

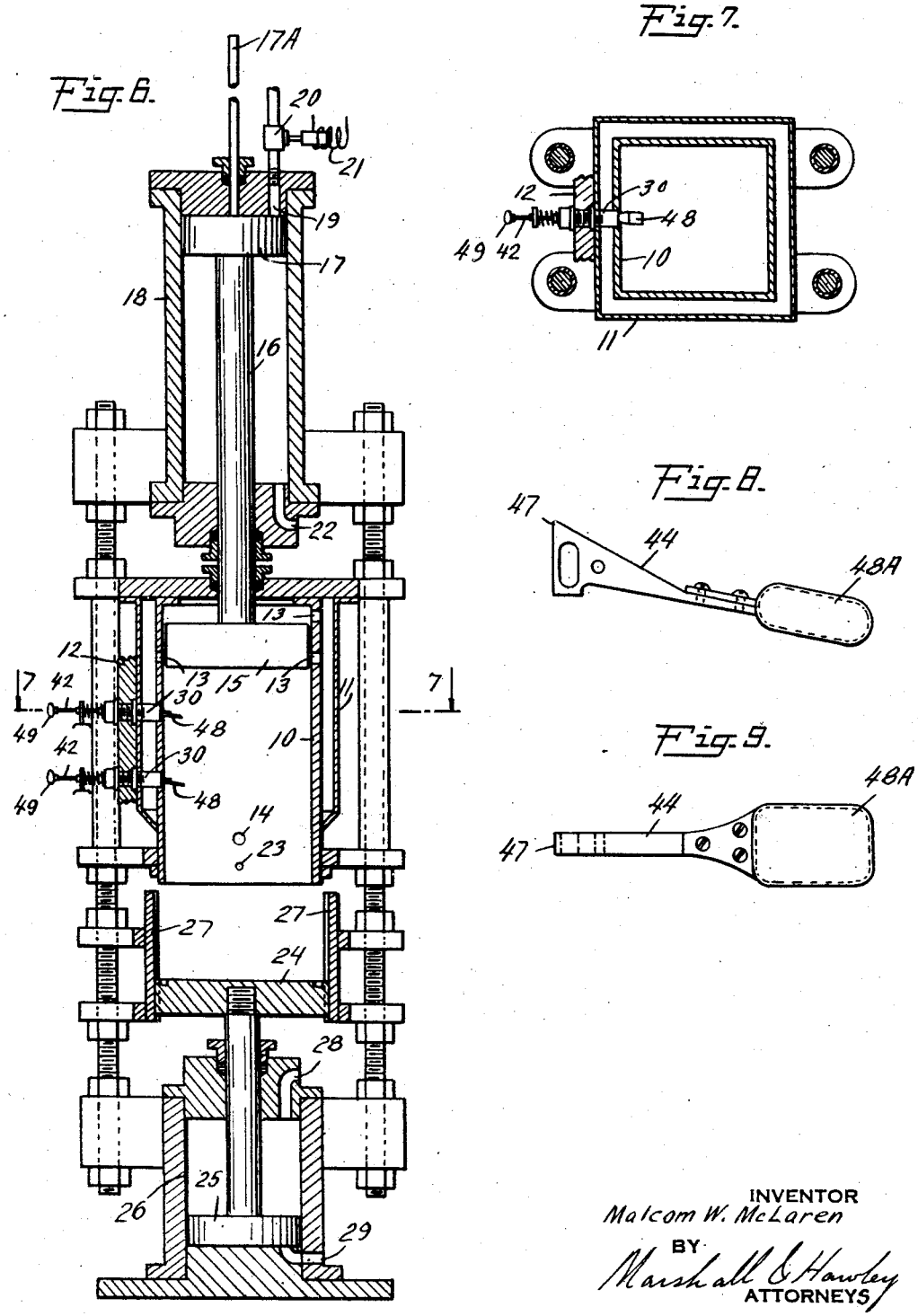

Patented Mar. 1, 1932

1,847,844

UNITED STATES PATENT OFFICE

MALCOLM W. McLAREN, OF JACKSON HEIGHTS, NEW YORK, ASSIGNOR TO CARBONIC EQUIPMENT CORPORATION, OF NEW YORK, N. Y., A CORPORATION OF NEW YORK

LEVEL INDICATOR

Application filed March 7, 1929. Serial No. 344,999.

This invention relates to improvements in level indicators and its object is to provide a simple and effective device which is arranged to be actuated by the rise of material inside of a tank or receptacle and which when actuated will be withdrawn from the interior of the tank or receptacle to leave the walls thereof unobstructed.

A further object of the invention is to so arrange such an indicator that it will control any desired instrumentality such as a signal or valve.

Other objects of the invention will appear in the following specification in which apparatus embodying the invention will be described and the novel features of which will be pointed out in appended claims.

The invention will be described in connection with the snow chamber and compressor of a carbondioxide solidifying machine, as this happens to be the first apparatus to which I have applied it. But it is in no sense limited to this particular use.

Referring to the drawings Fig. 1 is a sectional side elevation of a level indicator which is made according to and embodies the invention. Some of the instrumentalities which this device controls, are shown diagrammatically in this figure.

Fig. 2 is a similar view of some of the parts illustrated in Fig. 1 showing them in retracted position;

Fig. 3 is a sectional plan view of some of the parts shown in the preceding figures the section being taken on the line 3—3 of Fig. 1;

Figs. 4 and 5 are transverse sections taken respectively on the lines 4—4 and 5—5 of Fig. 1;

Fig. 6 is a sectional elevation of a carbondioxide solidifying machine showing two of the level indicators applied thereto;

Fig. 7 is a sectional plan view of the same apparatus taken on the line 7—7 of Fig. 6; and Figs. 8 and 9 are respectively a side elevation and a plan view of a modified form of one of the parts.

I will first describe the machine which is illustrated in Figs. 6 and 7, which is taken from a copending application, Cole and McLaren, Serial No. 279,641, filed May 22, 1928. It comprises a rectangular chamber formed by walls 10. An outer jacket is formed between the walls 10 and walls 11, outside of which is a body of insulation 12. Orifices 13 are provided between the rectangular chamber and the outer jacket. A nozzle is placed at 14 through which high pressure liquid $CO_2$ is discharged and expanded in the rectangular casing.

15 is a plunger connected by a rod 16 with piston 17 in a cylinder 18. This plunger fits loosely in the chamber to permit gases to pass it as it descends. 19 is a port above the piston 17 with which is connected a pressure pipe in which is an electro-magnetically controlled valve 20 comprising a solenoid winding 21. A similar port 22 is provided at the lower end of the cylinder. 23 is a vent port in the lower part of the rectangular chamber. 17A is an indicator rod by means of which the movement of the piston 17 and the plunger 15 may be observed.

The lower end of the rectangular chamber is arranged to be closed by a head 24 which is connected with a piston 25 in a cylinder 26. This head runs in fixed guides 27. Ports 28 and 29 are provided at the top and bottom of cylinder 26.

When the high pressure liquid $CO_2$ expands some of it forms snow which accumulates in the rectangular chamber. When a desired amount has been formed, the piston 15 is forced down to compress it. It was difficult to ascertain when the accumulated snow had reached the desired level in the chamber, and the improved level indicator described herein was devised to overcome this difficulty.

Now referring to Figs. 1–5 it will be seen that a threaded cylindrical housing 30 is thrust through a hole in the wall 10 at the desired level and screwed into an aligned threaded hole in the wall 11 and locked in place by a nut 31. Another nut 32 is screwed onto the housing after which the insulating jacket 12 may be put in place, or replaced if it has been broken away to permit the adjustment of nut 31. A head 33 is screwed onto the end of the housing and the nut 32 backed up against it to lock it.

40 is a slidable cylindrical bushing longitudinally slotted as at 41 to clear a detent 34 which projects through the inner surface of the housing 30. 42 is a rod which passes through a stuffing box 35 formed in the head 33. Its inner end is bifurcated and connected by a transverse pin 43 with the bushing 40. A tripper 44 is pivotally connected with this bifurcated and of rod 42 by a pin 45. This is slotted as at 46 to clear the pin 43. Its upper left hand end forms a pawl 47 for engagement with the detent 34 and a tripper blade 48 is affixed to its inner end. 49 is an indicator knob or handle affixed to the outer end of rod 40.

50 is a collar affixed to the rod 42 and 51 is a spring interposed between this collar and the head 33. The collar has a depending lug 52 which enters a slot 53 in a guide 54 extending from the head 33 to hold the pawl 47 in alinement with detent 34. 55 is a collar affixed to rod 42 to limit its outward movement.

56 is a plate affixed to the lug 52 with its ends bent downwardly to engage a lever 57 of an electric switch 58 to turn current onto and off from any desired instrumentalities such, for example, as a lamp 59, a bell 60 or a solenoid winding such as 21.

It may be seen that when the rod is pushed inwardly the tripper blade 48 will assume the position in which it is shown in Fig. 1 and that the engagement of pawl 47 with detent 34 will prevent the retraction of slidable bushing 40 and the parts it carries. But when snow formed in the rectangular chamber within the walls 10 reaches the tripper blade 48, the latter will rise thereby releasing pawl 47 and permitting spring 51 to move the parts back to the positions in which they are shown in Fig. 2. Thus the tripper blade will be drawn back of the inner surface of the wall 10 thereby permitting the plunger 15 to move downwardly.

When the device is used with a carbon-dioxide solidifying machine it is desirable to provide means to prevent the relatively movable parts from freezing together and in Fig. 1 an electric heating coil 30A is shown for this purpose.

At the time the parts are retracted, the plate 56 will move switch lever 57 to the position indicated at 57A to light a lamp, ring a bell or to energize any desired electric circuit. If the solenoid winding 21 is controlled by switch 58, it will open valve 20 and thus automatically initiate the downward movement of the piston 17 and the plunger 15.

In Fig. 6 two of these level indicators are shown at different levels. Obviously as many as desired may be provided.

In Figs. 8 and 9 a float 48A is shown on the end of the tripper instead of a blade. This arrangement is designed for use with liquids, and is added to show that I do not intend to limit the invention to its use with carbon-dioxide solidifying machine such as that described for illustrative purposes.

What I claim is:

1. A lever indicator comprising a member adapted to project through the wall of a receptacle, a pivotal support therefor, means including a spring arranged to move said support to retract the member from within the receptacle, and means for locking the support against movement by the spring, said means being releasable by movement of the member about its pivot.

2. A level indicator comprising a member adapted to project through the wall of a receptacle, a pivotal support therefor, means including a spring arranged to move said support to retract the member from within the receptacle, and a pawl and detent for locking the support against movement by the spring, said pawl being releasable from the detent by movement of the member about its pivot.

3. A level indicator comprising a member forming a pawl and having, a portion adapted to project through the wall of a receptacle, a slidable support, a transverse pivot connecting the member, and the support means including a spring arranged to move the support to retract the member from within the receptacle, and a detent with which said pawl engages to lock the support against movement by the spring, said pawl being disengaged from the detent by movement of the member about the pivot.

4. A level indicator comprising a member forming a pawl and having a portion adapted to project through the wall of a receptacle, a slidable support, a transverse pivot connecting the member and the support, means including a spring arranged to move the support to retract the member from within the receptacle, a detent in the path of movement of the pawl, and manual means for moving the support and the member against the action of the spring into position for the pawl to engage the detent, said pawl being disengaged from the detent by movement of the member about the pivot.

5. A level indicator comprising a member adapted to project through the wall of a receptacle, means including a spring arranged to retract the member from within the receptacle, means for projecting the member through the wall of the receptacle against the action of the spring, means for holding the member in its projected position, said member being arranged to be moved by material within the receptacle to release said holding means, and an instrumentality actuated by said retractive movement.

6. A level indicator comprising a member forming a pawl and having a portion adapted to project through the wall of a receptacle, a slidable support, a transverse pivot connecting the member and the support, means including a spring arranged to move the support to retract the member from within the receptacle, a detent with which said pawl engages to lock the support against movement by the spring, said pawl being disengaged from the detent by movement of the member about the pivot, and an instrumentality actuated by said retractive movement.

7. The combination of a receptacle, a plunger movable therein, a level indicator comprising a member adapted to project through the wall of the receptacle a pivotal support therefor, means including a spring arranged to move said support to retract the member from within the receptacle, means for locking the support against movement by the spring, said means being releasable by movement of the member about its pivot, said member being movable by contact of material in the receptacle, means for actuating the plunger, and means controlled by the retractive movement of the member for controlling said plunger actuating means.

8. The combination of a receptacle, a plunger movable therein, a level indicator comprising a member forming a pawl and having a portion adapted to project through the wall of the receptacle, a slidable support, a transverse pivot connecting the member and the support, means including a spring arranged to move the support to retract the member from within the receptacle, and a detent with which said pawl engages to lock the support against movement by the spring, said pawl being disengaged from the detent by movement of the member about the pivot, means for actuating the plunger, and means controlled by the retractive movement of the member for controlling said plunger actuating means.

MALCOLM W. McLAREN.